March 14, 1961  E. R. KNOWLES  2,974,362
APPARATUS FOR MOLDING HOLLOW ARTICLES OF PLASTIC
Filed Dec. 20, 1956  7 Sheets-Sheet 1

INVENTOR.
EDWARD R. KNOWLES
BY
Marechal, Biebel, French & Bugg
ATTORNEYS

March 14, 1961   E. R. KNOWLES   2,974,362
APPARATUS FOR MOLDING HOLLOW ARTICLES OF PLASTIC
Filed Dec. 20, 1956   7 Sheets-Sheet 6

INVENTOR.
EDWARD R. KNOWLES
BY
*Marchal, Biebel, French & Bugg*
ATTORNEYS

March 14, 1961 E. R. KNOWLES 2,974,362
APPARATUS FOR MOLDING HOLLOW ARTICLES OF PLASTIC
Filed Dec. 20, 1956 7 Sheets-Sheet 7

*INVENTOR.*
EDWARD R. KNOWLES
BY
ATTORNEYS

United States Patent Office

2,974,362
Patented Mar. 14, 1961

2,974,362

APPARATUS FOR MOLDING HOLLOW ARTICLES OF PLASTIC

Edward R. Knowles, Fairfield, Conn., assignor to The Specialty Papers Company, Dayton, Ohio, a corporation of Ohio Filed Dec. 20, 1956, Ser. No. 629,542

6 Claims. (Cl. 18—5)

This invention relates to molding hollow articles from plastic or resin materials and, more particularly, to forming simultaneously a plurality of such articles by first molding a plurality of parisons for such articles in parison molds and then transferring the parisons thus produced to finishing molds where they are blown to finished form.

Conventional methods and apparatus for making molded plastic bottles or like hollow articles of plastic material may be found inadequate or uneconomical under present-day conditions for producing such articles at desirably low unit cost, and such conditions may be especially encountered in the production of plastic bottles by conventional methods and apparatus in which bottles are molded and blown only one or two at a time or in which several molding, blowing, or other manufacturing steps are performed separately and sequentially on each individual bottle or other article being molded and blown.

According to this invention, however, methods and apparatus are provided for producing molded and blown hollow articles of various forms from plastic materials at favorable unit cost and while maintaining the quality and effectiveness of the finished product, as well as for producing a plurality of such articles simultaneously and simultaneously subjecting a plurality of such articles to the various manufacturing steps. Furthermore, apparatus embodying features of this invention is of relatively simple construction which can be built and installed at moderate cost. In such apparatus, where the several phases of operation are automatically controlled, minimum supervision is required for the operation thereof, and molds or dies of widely varying sizes and cavity contour may be employed to produce correspondingly varied sizes and forms of products with readily accomplished changeover from one size or form to another and with only minimum loss of operating time.

One object of this invention is to provide apparatus of the character described for molding and blowing hollow articles of plastic materials in which, as a unitary operation, a parison of the article is molded in a parison mold from moldable plastic material, and then the parison so molded is transferred to a finishing mold where the hollow article is blown to finished form.

Another object of this invention is to provide a method of the character described for molding and blowing hollow articles of plastic materials in which a parison of the article is injection molded from moldable plastic material and is then transferred to a finishing mold where the parison, while still hot and deformable, is blown to finished form and ejected from the finishing mold as a finished article without further manufacturing or forming steps or treatment.

A further object of this invention is to provide apparatus of the character described for molding and blowing hollow articles of plastic materials in which, as a unitary operation, a plurality of parisons of the article are molded simultaneously in a plurality of parison molds from moldable plastic material, and then the parisons so molded are all simultaneously transferred to a plurality of finishing molds where the hollow articles are simultaneously blown to finished form.

Still another object of this invention is to provide a method of the character described for simultaneously molding and blowing a plurality of hollow articles of plastic materials in which parisons of the articles are injection molded from moldable plastic material and are then all simultaneously transferred to finishing molds where the parisons, while still hot and deformable, are all simultaneously blown to finished form and ejected from the finishing molds as finished articles without further manufacturing or forming steps or treatment.

A further object of this invention is to provide a machine for molding thermoplastics wherein the arrangement of the parison and finishing molds and their respective actuation devices is such that said molds are actuated independently whereby the timing of any given operating phase of each may be determined and controlled substantially independently of the other to produce optimum results.

Another object of this invention is to provide apparatus in which separate mounting and actuating control of the parison and finishing molds will permit more accurate and uniform register of the mold parts to insure effective closure of the cavities of both molds in spite of differences in their construction, mode of actuation and operating conditions, and to permit more effective control over cooling of the parison molds and heating and cooling of the finishing molds.

Still a further object of this invention is to provide in apparatus of the character described, an arrangement of a core or hollow plug around which each parison is molded and on which it is carried whereby movement of the longitudinal core axis is confined within the common vertical axial plane of the core and of both molds to reduce inertia effects incident to core movement and thus facilitate accurate and smooth cooperation at optimum operating speeds between the core and both of the molds.

A still further object of this invention is to provide apparatus including in general means for supporting a set of cooperating parison molds one part of each of which is movable in relation to the other, means for moving the movable parison mold part toward and from the stationary parison mold part to open and close the mold, means at one side of the parison mold for heating plastic material and injecting the same into the parison mold cavity and around a hollow core which extends into each mold cavity, means for supporting and actuating a set of cooperating finishing molds at the opposite side of and spaced from the set of parison molds, means for moving said finishing mold parts to and from a parison confining position, means for supporting the core in operative relation to the set of parison molds when the latter receives a charge of plastic from the injector and in operative relation to the set of finishing molds when the parison is confined therein and expanded to hollow form, means for moving the core from each parison mold, after forming a parison on the core, to an operative position in the set of finishing molds, and for applying fluid pressure, such as gas or air, through the core to the interior of a parison thereon while confined in a finishing mold and thereby to expand the parison into the form of a hollow article and thereafter, when the finishing mold parts are in open relation, to separate and discharge the finished article from the core.

Other objects and advantages of this invention will be apparent from the following description, the accompanying drawings, and the appended claims.

Figures 1, 5:
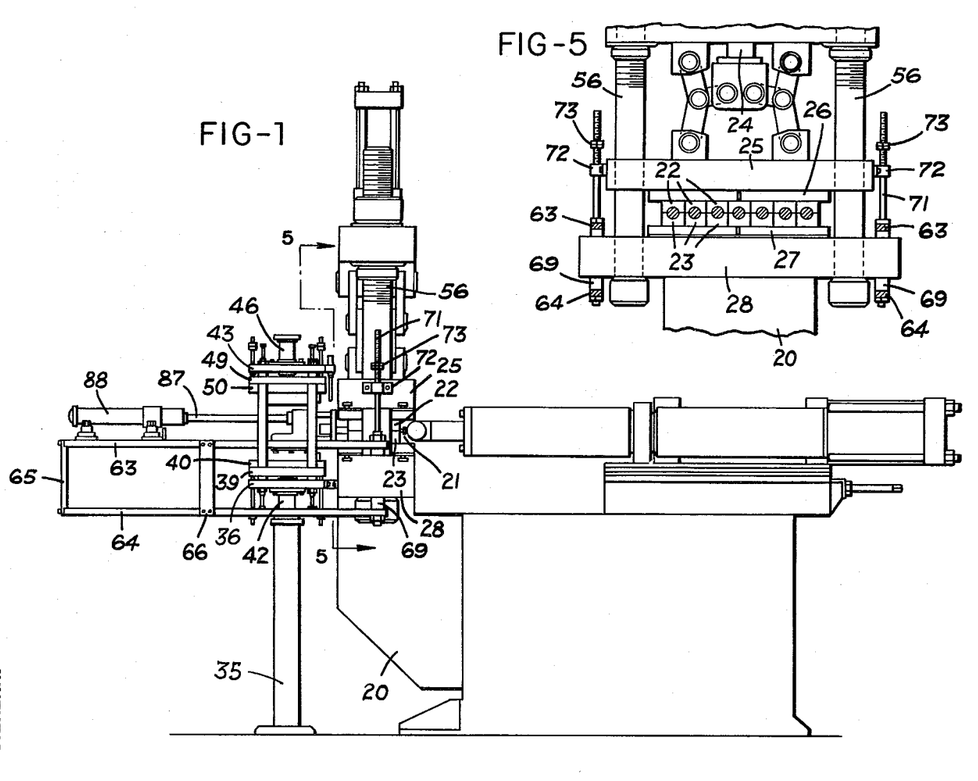
Fig. 1 is a side elevation of apparatus embodying this invention.
Fig. 5 is a fragmentary view partly in vertical section along the line 5—5 of Fig. 1.

Referring to the drawings in which like reference characters designate like parts throughout the several views thereof, apparatus embodying this invention is illustrated in Figs. 1 and 5 as having a base 20 supporting conventional devices for injecting molten plastic material through nozzles as 21 into the cavities formed between cooperating upper and lower parison mold parts 22 and 23. The lower or stationary mold part 23 is stationary on base 20, the upper mold part 22 being movable toward and from said stationary part by conventional or other suitable actuating devices including a toggle actuated by a plunger 24, Fig. 5, and carrying a head plate 25 and a heat exchange plate 26 to which said movable parison mold part 22 is releasably secured and thus readily interchangeable with other parison mold parts of various sizes and cavity contour designs.

A stationary heat exchange plate 27 is operatively mounted between said stationary mold part 23 and a stationary mold supporting bed 28 forming part of base 20; and said stationary mold part 23 is releasably secured to said heat exchange plate 27 and is readily interchangeable with other mold parts for cooperation with said various appropriately designed and interchangeable movable parison mold parts 22.

The machine as shown also includes a set of finishing mold parts conveniently positioned in spaced relation to said parison molds. Thus, spaced posts 35 (Fig. 4) or other suitably rigid and stationary support, carry a lower guide or base plate 36 at their upper ends, said guide plate being securely connected by straps 37, Fig. 6, or other suitable means in rigid spaced relation to an end portion of base 20. Each of said posts 35 also supports at its upper end a cylinder 42 having a fluid actuated piston 38, Fig. 3, secured at its outer end to a mold carrying plate 39 which is arranged to support a heat exchange plate 40 and the lower mold part 41 of a set of cooperating finishing mold parts releasably secured to said heat exchange plate 40. Each mold part is interchangeable with other finishing mold parts of various sizes and cavity contour designs. Said pistons 38 are actuated in unison by fluid pressure to raise and lower said lower mold part 41.

Figure 2:
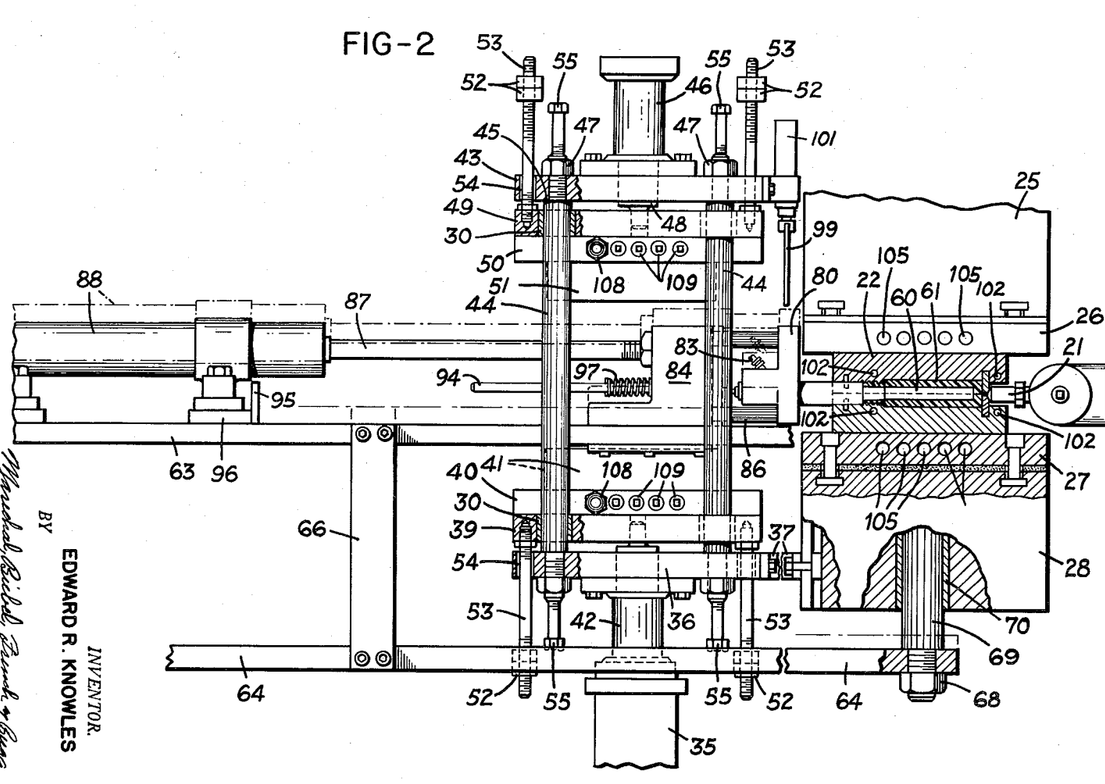
Fig. 2 is a fragmentary view on enlarged scale of the apparatus of Fig. 1 and with portions broken away and in vertical section showing details of mold actuating and core positioning devices as disposed when the core is confined between the parison mold parts in position to receive a charge of plastic from the injecting nozzle.
Figure 4:
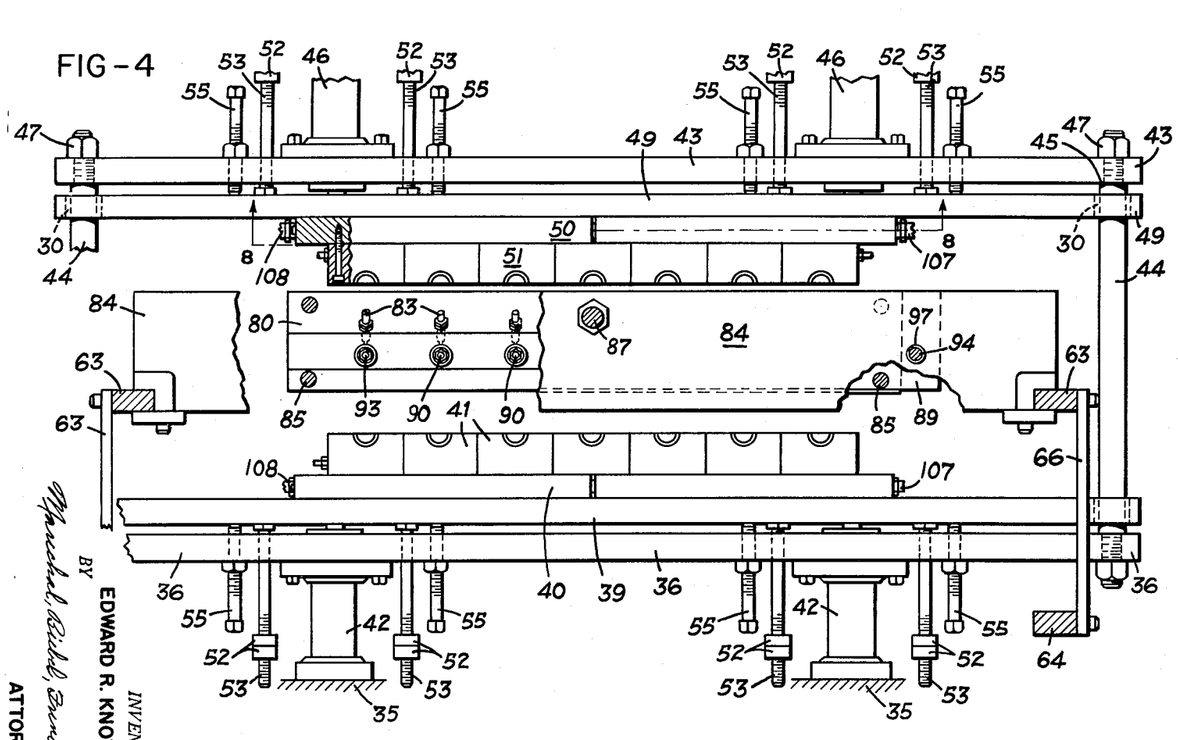
Fig. 4 is a transverse vertical section on the line 4—4 of Fig. 2.

Vertically spaced from said lower guide plate 36, Figs. 2 and 4, and supported thereon is an upper guide and support plate 43 clamped to said lower plate 36 by rods 44 which have reduced end portions extending through said plates and a central portion of enlarged diameter forming shoulders 45 for spacing said plates 36 and 43. Said upper plate 43 and lower plate 36, thus assembled with said rods 44, shoulders 45, and nuts 47, are clamped together to form a rigid frame with upper plate 43 thereof supporting upper cylinders 46 having fluid pressure actuated pistons 48.

The outer ends of pistons 48 of said upper cylinders 46 are secured to upper mold carrying plate 49 and raise and lower said plate along with a heat exchange plate 50 secured thereto and an upper finishing mold part 51 releasably secured to said heat exchange plate 50.

Said upper cylinder 46 and said lower cylinder 42 are connected in any well known or suitable manner with a source of fluid pressure so that their respective pistons 48 and 38 can be moved in unison toward each other to close the finishing molds and away from each other to open said molds.

As disclosed more clearly in Figs. 2 and 4, inward or closing movement of the finishing molds is limited by adjustable stop nuts 52 threaded on bolts 53 mounted in the upper and lower carrier plates 49 and 39, respectively. Said bolts 53 extend freely through guide holes 54 provided in the upper and lower fixed guide plates 43 and 36, respectively. Outward or opening movement of said finishing mold carrying plates 39 and 49 is limited by adjustable stop bolts 55, Fig. 4, threaded in said fixed mold carrying plates 36 and 43 with their inner ends positioned to engage and limit the extent of outward movement of said movable plates 39 and 49 which are provided with annular bearings 30 which slide freely on rods 44.

Figure 3:
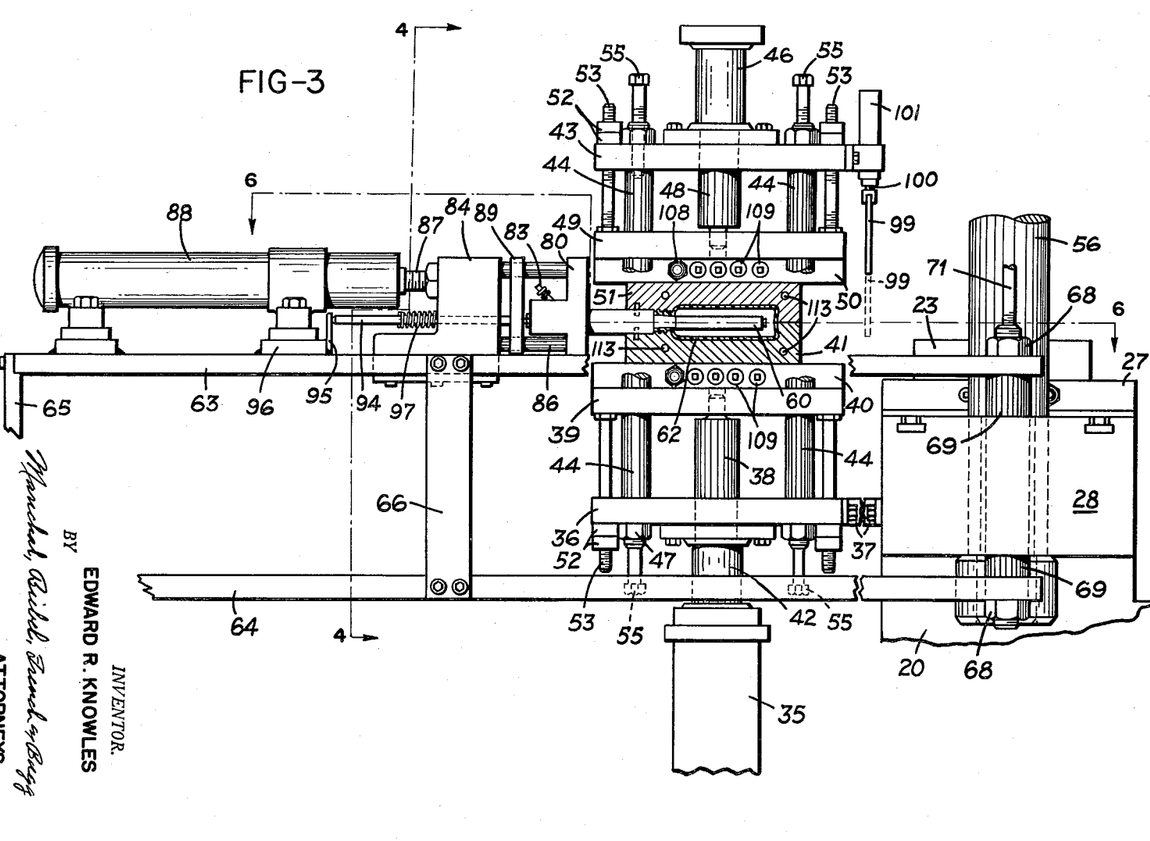
Fig. 3 is a view similar to Fig. 2 but with the core in position confined in a finishing mold cavity and showing the parison carried thereon blown to final hollow article form.
Figure 7:
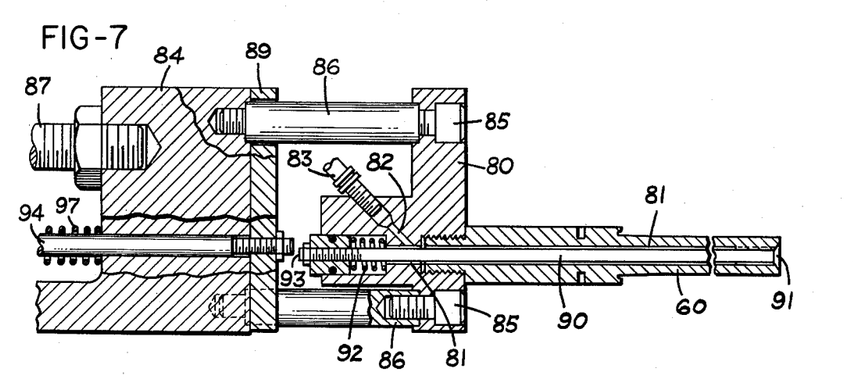
Fig. 7 is a fragmentary view on enlarged scale in vertical section on the line 7—7 of Fig. 6 showing details of construction and mounting of the hollow core, its carrier, and devices for controlling admission of fluid pressure to said core.

As seen in Figs. 2, 3 and 7, a hollow core or plug 60 is mounted on a core positioning and transporting carrier. In one end position of said carrier, Fig. 2, with the core in casting position, said core is engaged with and confined in a parison mold cavity to receive a parison 61; and at the other end position of said carrier and while carrying said parison, said core is engaged with and confined in a finishing mold cavity, Fig. 3, wherein the parison 61 is blown to the finished article form 62 by means to be described.

The core carrier above referred to comprises a frame having spaced upper and lower longitudinal members, the upper members being tracks 63, Fig. 4, which are connected to lower members 64 by vertical elements, as braces 65 and 66. Inner end portions of said longitudinal elements are clamped securely in spaced relation by nuts 68 threaded on tie rods 69, Figs. 2 and 3. As seen more clearly in Fig. 2, said tie rods 69 are mounted to slide vertically in bushings 70 extending through the lower or stationary mold supporting bed 28 when the core frame is raised and lowered with corresponding vertical movements of head plate 25 and upper parison mold 22, as hereinafter described.

For this purpose, the lower ends of core frame lifting rods 71, Fig. 5 are threaded into or otherwise suitably secured to the upper ends of tie rods 69 and extend thence upwardly through and are freely slidable in brackets 72 projecting laterally from said head plate 25 which slides on posts 56 when actuated by piston 24. Upper end portions of lifting rods 71 are threaded to receive stop nuts 73 adjustable to different operative positions thereon. The arrangement of the several parts just described is such that, when head plate 25 is raised, it initially lifts upper parison mold part 22 from closing engagement with lower parison mold part 23. During said initial upward mold opening movement of head 25, the assembly, which includes said rods or tie bolts 69 and frame elements associated therewith, remains inert in the full line position of Fig. 2. Continued upward movement of head 25, however, brings brackets 72 thereon into engagement with nuts 73 thereby lifting said rods 71 and the parts connected therewith and constituting the core carrying frame to dotted line positions, Fig. 2, and thus raising core 60 and a parison, as 61 thereon out of the mold cavity of lower parison mold part 23. At the end of upward movement of said head 25, it holds said frame in raised (dotted line) position, wherein initially core 60 and the parison 61 thereon are disposed between the separated upper and lower parison mold parts and with the longitudinal axis of said core 60 in the vertical plane common to the longitudinal axes of said parison mold parts 22 and 23. In operation, said core carrying frame is maintained in the above described raised or upper position while the core and a parison thereon are moved outwardly horizontally and longitudinally of the frame to bring said core 60 and parison 61 thereon into finishing position wherein the core and parison are enclosed in the cavity between said upper and lower finishing mold parts 51 and 41 respectively, Fig. 3, when the latter are moved toward each other by means previously indicated. Thus, all vertical and all endwise or horizontal movements of core 60 between the parison and the finishing molds are in the vertical plane common to the axis of the core and to the axes of the cooperating parison and finishing mold parts above described.

When a hollow article has been completed and discharged from core 60 by means to be described said core 60 is moved back horizontally and longitudinally in relation to the frame and over the same path to its lifted position between the separated parison mold parts 22, 23. With reversed mold closing downward movement of head 25 in the next operating cycle, the core carrier returns by gravity, aided by spring means if desired, to its initial lower position, thus bringing core 60 to rest in operative casting position where it is engaged with stationary parison mold part 23. At this point in the operating cycle and with continued downward travel of head 25, brackets 72 disengage from under stop nuts 73 and the parison mold parts are brought together and conditioned to receive a new parison forming charge from nozzles 21.

The parts hereinabove described provide in effect a floating core carrier which enables the core readily to adjust or conform to slight variations in the dimensions or arrangement of the mold parts served by said core. Thus hollow plastic articles can be made accurately and rapidly and with less need for close tolerances, in the making and assembly of the machine parts involved.

Suitable mechanism is provided for effecting the above described horizontal endwise or axial travel of core 60 on its supporting frame to and from its finishing position between mold parts 41 and 51. As shown in Fig. 7, the inner end of core 60 is threaded in a core carrier plate 80 coaxially and in fluid pressure transmitting connection with a longitudinal bore 81 extending axially therethrough. Fluid pressure is admitted to said bore 81 through an obliquely disposed duct 82 with its inner end opening into said bore 81 and its outer end arranged to engage and receive a suitable fitting at the discharge end of a fluid pressure delivering pipe 83. Said core carrier plate 80 is secured in spaced relation to and opposite one side of a cross bar 84, as by bolts 85 and spacing studs 86. A piston 87 actuated in a known manner by fluid pressure in a cylinder 88, Figs. 1, 2 and 3, has its outer end threaded to an upright portion of the other side of said cross bar 84 which is slidably supported at its ends on and between the longitudinal guide bars or rails 63. Thus, when piston 87 is extended, Fig. 2, core 60 is brought to parison mold engaging position; and when said piston is retracted, core 60 is brought to finishing mold engaging position, Fig. 3.

The admission of fluid pressure into bore 81 of core 60 and its passage therethrough are controlled by conventional or any suitable valve means. As shown in Fig. 7, a plunger 90 having a flanged head 91 at its outer end is mounted in the bore 81; and a coil spring 92 normally holds the head of said plunger 90 yieldingly in position to close the open inner end of said bore 81.

The opposite or outer projecting end 93 of plunger 90 is arranged to come into engagement with a buffer plate 89; and the spacing studs 86 extend through openings in said buffer plate 89 to permit relative movement between said plate and cross bar 84.

Figure 6:
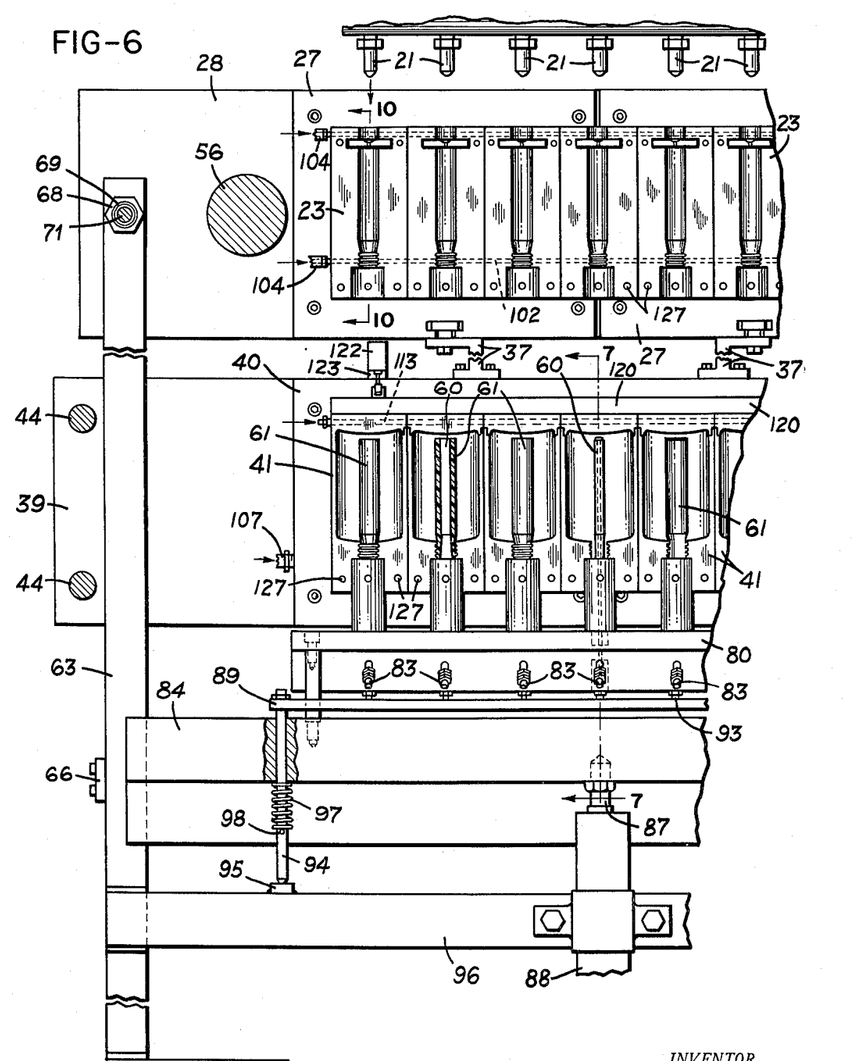
Fig. 6 is a horizontal section on the line 6—6 of Fig. 3 with portions broken away and showing, in operative relation to other parts, a plurality of stationary parison mold parts arranged in plastic receiving relation to corresponding injection nozzles and a plurality of lower finishing mold parts positioned to receive parisons formed on the hollow cores in the opposed parison molds and adapted to confine said parisons while being blown to final hollow form.

As shown more clearly in Fig. 6, said buffer plate 89 is carried on cross bar 84 by means of stud pins 94 which slide freely in holes in the cross bar 84 and are arranged with their free ends positioned to engage rigid stops 95 mounted on cross piece 96 of the core carrier frame. Coil springs 97 are carried on intermediate portions of stud pins 94 with one end bearing against the outer face of the upright portion of cross bar 84 and the other against a stop pin 98, Fig. 3, on stud pin 94 thereby biasing the buffer plate 89 toward retracted position, or as shown in Fig. 2. Alternatively, springs 97 may be omitted if springs 92 are sufficient to return plate 89 to a position allowing plunger 90 to close as required.

In operation, as cross bar 84 is retracted toward its end or finishing position, Fig. 3, by piston 87, the outer ends of stud pins 94 come into engagement with stops 96; but cross bar 84 continues retracting movement meanwhile compressing springs 97 until the exposed ends 93 of valve plungers 90 encounter buffer plate 89 whereby said plungers are pressed inwardly to valve opening position. This effect is timed to occur when core 60 with a parison 61 reaches proper position to be engaged between the finishing molds 41 and 51.

In an embodiment designed for optimum automatic operation the sequence and duration of steps in the operating cycle are conveniently controlled by conventional or other suitable timing mechanism, although it will be apparent that hand controls could also be used. Thus, for fluid pressure actuation of the various parts, valves (not shown) are interposed in pressure conduits or pipes, as 83, and are so connected with time controlled or other suitable valve actuating devices, such as limit switches actuated by the mechanical movements of the various parts in known manner, that fluid, as air under pressure is released into said pipes 83 and thence through core 60 into the parison 61 thereon to expand said parison while heated to plastic condition in the finishing mold cavity to produce the desired hollow plastic article, as 62. The air pressure is cut off when expansion of the parison is complete; and the finishing mold is opened by suitable pressure controlling devices related to the cylinders 38 and 48 in a manner to move the mold parts 41 and 51 apart when the article 62 has cooled to a non-plastic or non-expansible finished condition.

When said mold parts 41 and 51 are in separated relation, the article 62 is conveniently discharged from its position on core 60 by again admitting air pressure through pipes 83 into core 60 and against the bottom walls of articles 62 thus dislodging said articles 62, which are intercepted by a stop gate 99 normally positioned as shown in Fig. 3 (full line). Said gate 99 is moved downwardly to operative intercepting (dotted line) position by a fluid pressure operated piston 100 in cylinder 101 and is returned upwardly to said normal (full line) position conveniently by a spring or the like to permit return movement of core 60 in its horizontal path toward casting position in the next operating cycle. The discharged articles intercepted by gate 99 drop freely through the space between the finishing mold supports and the parison mold supporting portions of base 20 into collecting receptacles or conventional conveying devices not shown.

The heating and cooling of the molds themselves are also preferably controlled automatically through thermostatic devices, although hand actuated controls may satisfactorily be employed. In the molding of plastic materials it is desirable to inject the molten mass into the parison mold under such conditions that the cavity space around the core may be completely and uniformly filled before solidification or setting takes place. Also, it is preferred to use a so-called "hot runner" injection molding technique whereby that portion of the injected plastic remaining in the injection nozzles 21 is in molten condition so that a clean break-off of plastic occurs at the parison mold upon completion of injection. As illustrative of the operating conditions according to this invention, it may be noted that the plastic material is originally injected in the parison molds 22, 23 at a temperature of the order of above 250° F., and the parison molds are preferably maintained at a temperature of the order of 80° F., while the finishing molds are preferably at room temperature.

It is desired, thus, that the parison molds be maintained at a fairly elevated temperature so that the parisons will be sufficiently plastic to respond to the blowing action in the finishing molds, and yet in a temperature range sufficiently less than the injection temperature so that the parison can be released intact from the parison molds.

Figures 10, 11:
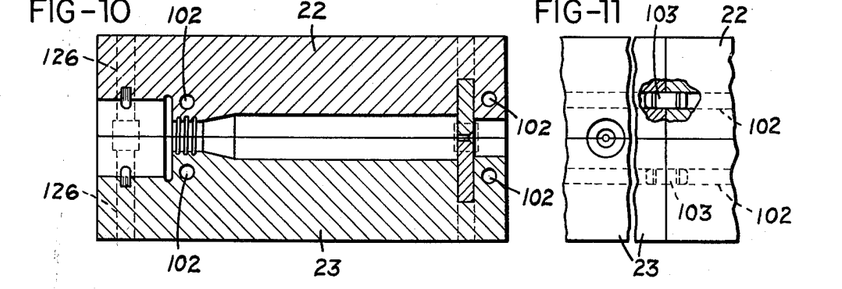
Fig. 10 is a transverse vertical section on the line 10—10 of Fig. 6, showing parison mold parts in closed relation.
Fig. 11 is a fragmentary end view on enlarged scale partly in horizontal section of the parison mold parts shown in Fig. 10 and showing ends of fluid conduits provided in adjacently positioned mold parts or separate dies.

Heating and cooling means for the purposes above mentioned are seen more clearly in Figs. 6, 7, 8, 10 and 11. In the case of the parison molds 22, 23, coolant is supplied locally to the neck and sprue ends of the mold parts through passages or conduits 102 drilled through said parts, Figs. 6, 10, and 11. This local cooling is primarily directed to the neck portion since, in the case of forming plastic bottles, the neck or threaded portion of the bottle is substantially finished in the parison mold and should thus be chilled to an extent greater than the body portion of the parison which is later to be blown in the finishing mold. The opposite end portion of the parison mold is also cooled locally as being that portion of the mold most subjected to heat from the injection nozzles and to insure adequate cooling of the bottom portion of the parison which is last injected and first subjected to the force of air in the blowing step. To this end, coupling tubes 103, Fig. 11, are provided at the joints between contiguous individual parison mold parts assembled on head 25 to form a multiple parison mold part 22 or 23. A coolant is admitted to said conduits through suitable connections 104 and conventional valves, not shown, if desired, by which the supply of coolant is regulated to maintain the temperature within the desired range.

To maintain the parison mold parts 22, 23 generally within the desired operating temperature range, heat exchange plates 26 and 27 are provided having transverse passages or ducts 105 therethrough. Such passages may be arranged for circulation of a heating medium such as steam or hot water in substantially the same manner as will later be described for coolant circulation means in plates 40 and 50, but are preferably simple transverse bores through pipes 26 and 27 in which may be accommodated conventional electric heating elements, such as the well-known "Calrod" electric heaters for adjustable control of the temperature of parison molds 22, 23 to maintain these molds within the desired operating temperature range.

Figure 8:
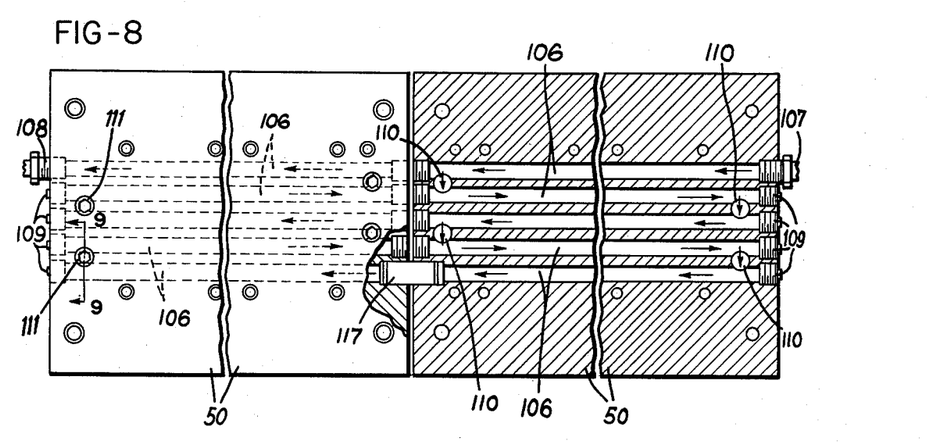
Fig. 8 is a fragmentary view on enlarged scale partly in horizontal section on the line 8—8 of Fig. 4, and illustrating an arrangement of conduits in the heat exchange plate with connections for cooling the upper finishing mold part, similar cooling means also being supplied for the lower of said finishing mold parts.
Figure 9:
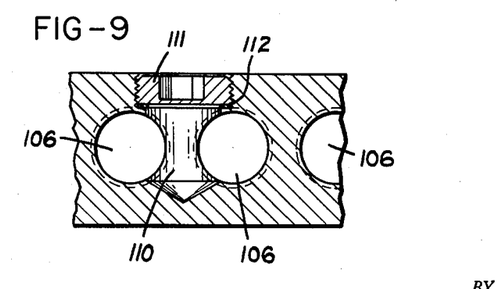
Fig. 9 is a transverse vertical section on enlarged scale on line 9—9 of Fig. 8 illustrating a pipe or coupling for connecting end portions of adjacent conduits in a heat exchange plate for supplying heating or cooling fluids to the molds.

Whereas the parison molds 22, 23 are desirably maintained at elevated temperature, the finishing molds 41, 51 are preferably maintained at approximately room temperature for rapid chilling of the plastic material upon being blown or expanded against the finishing molds during the blowing step. To this end, heat exchange plates 40 and 50 for finishing molds 41, 51 are provided, as shown in Fig. 8, with interconnecting passages or conduits 106 for the circulation of coolant therethrough. Since both heat exchange plates 40, 50 may be substantially identical only one of them (50) is illustrated in detail in Fig. 8. Thus, a coolant medium, admitted at inlet fitting 107, passes in a zig-zag path through conduits 106 and out by outlet fitting 108, as indicated by the arrows in Fig. 8. For ease of manufacture, conduits 106 are preferably formed by drilling straight through plate 50 (or, if plate 50 is made in two parts as indicated in Fig. 8, straight through each part) along parallel lines to form a plurality of transverse parallel passages or conduits. End openings of each such passage or conduit are then closed by threaded plugs 109, and an end portion of each conduit 106 is connected with an adjacent end portion of an adjoining conduit simply by drilling a bore or port 110, Figs. 8 and 9, of great enough diameter to span the distance between adjacent conduits 106, the open ends of which ports are then conveniently closed by plugs 111 and gaskets 112. If plate 50 (or identical plate 40) be manufactured, for convenience, in two parts as indicated in Fig. 8, a slip nipple 117 with suitable sealing means interconnects with the conduits 106 in one part of plate 50 with the conduits 106 in the other part. As will be understood, the coolant is supplied to heat exchange plates 40 and 50 through valves, preferably thermostatically controlled, arranged and adapted in known manner to maintain heat exchange plates 40 and 50, and the finishing mold parts 41, 51 attached thereto, within the desired operating temperature range.

Upper and lower finishing mold parts 41 and 51 are also equipped with additional local coolant channels or ducts 113 transversing the mold parts themselves by substantially the same arrangement as indicated for conduits 102 in the parison mold parts 26, 27, for more particular local chilling of the neck portion of the blown article and the bottom thereof to insure adequate setting of the plastic material for ejection of the finished article off core 60 when finishing mold parts 41, 51, separate as herein described after the blowing step. Conventional fittings 114 such as clip nipples, connect adjacent ends of conduits 113 between contiguous finishing mold parts to form a continuous conduit 113 transversing all the multiple finishing mold parts 41 or 51 mounted on heat exchange plates 40 and 50.

Figures 12, 13:
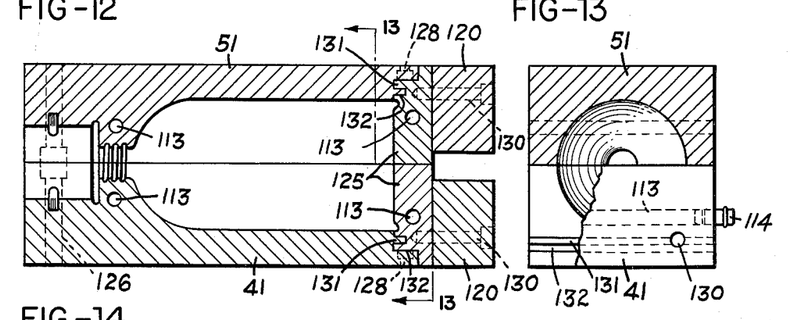
Fig. 12 is a fragmentary view on enlarged scale in central longitudinal section of finishing mold parts showing an arrangement wherein retractable bottom end closing plates are employed in connection with said mold parts.
Fig. 13 is a fragmentary end view on enlarged scale partly in transverse vertical section on line 13—13 of Fig. 12.
Figure 14:
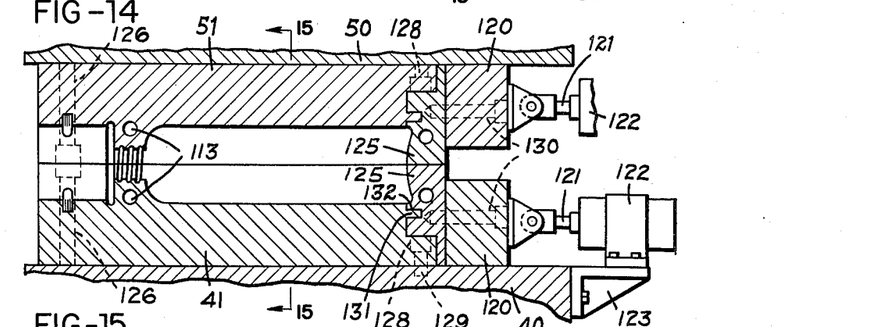
Fig. 14 is a fragmentary view on enlarged scale in central vertical longitudinal section of cooperating finishing mold parts where the cross sectional contour of the finished article is to be oval and showing an arrangement for retracting the end closing plates from the mold parts.
Figure 15:
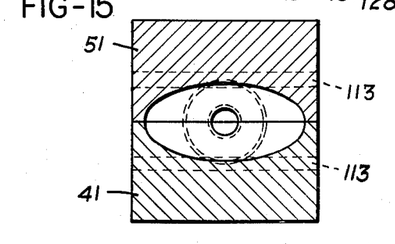
Fig. 15 is a fragmentary section on enlarged scale on the line 15—15 of Fig. 14.

As indicated in Figs. 6, 12 and 14, the finishing mold may with advantage include structural features whereby a wide range of variation in the bottom wall design or marking of the finished product is afforded with a minimum of added mold parts and a minimum cost in labor and operating time lost in changing from one to another. For such purposes, a presser bar 120, Figs. 12 and 14, is mounted on pistons 121 actuated in unison by fluid pressure devices, as cylinders 122, supported on spaced brackets 123, one being shown in Fig. 6. These brackets are conveniently secured to the lateral faces of the upper and lower heat exchange plates 50 and 40, respectively, the latter being shown in Figs. 6 and 14.

To insure optimum bottom closure of the finishing molds thus equipped, the bottom ends of the cavity defining portions of mold parts 41 and 51 are formed to dovetail with portions of interchangeable closure plates 125 which are releasably secured to presser bar 120 with their cooling ducts or conduits 113 interconnected by fittings 114. As indicated in Figs. 6, 12 and 14 the finishing mold parts are drilled and countersunk, as at 126 for example, Fig. 12, to receive screws 127, Fig. 6, by which the neck end portions of said mold parts 41 and 51 are releasably secured to their respective heat exchange plates. Similarly, said mold parts 41, 51 are drilled and countersunk at 128; and the open or bottom end portions thereof are releasably secured by screws 129, Fig. 14, to their respective heating plates, as mold part 51 to heat exchange plate 40. Each presser bar 120 is also drilled and countersunk, as at 130, Fig. 12, to receive screws which engage and hold the end closure plates 125 as a set securely in operative aligned relation thereon. The tongues 131 and grooves 132 of said plates 125 slidably engage the corresponding opposed grooves and tongues, respectively, of the aligned mold parts, as 41, and thus provide effective guide means to maintain said plates in register with said mold parts.

A set of closure plates 125 assembled with mold parts as above described is moved as a unit by presser bar 120 and pistons 121 to close the open ends of the finishing molds securely while the parisons therein are being expanded and set to final form. In mold structures where the cavity contours present no undercut portions at their bottom ends or where the molded article is made of a sufficiently flexible material, as polyethylene, separation of the mold parts and resulting release of the finished article, as a bottle, are readily accomplished. However, where markings or design patterns on the bottom wall of the article require projections on or indentations in the mold or where the molded article is made of a more rigid material, as polystyrene, the above described retractable closure plate construction has the important advantage that it serves with equal effectiveness in making bottles varying widely in design, markings and physical characteristics of the materials employed.

Thus, in a typical cycle after the expanded article has attained its final form and condition and before the molds 41 and 51 are moved apart, the presser bar 120 and attached closure plates 125 are retracted by pistons 121 sufficiently to permit all parts of the cavity surfaces of said plates to move freely in a vertical direction past all parts of the end faces of the finished articles when mold parts 41 and 51 and the upper and lower, Fig. 14, sets, respectively, of end closure plates 120 are moved apart. Ordinarily, the extent of movement of plates 120 toward and from the open or bottom ends of the finishing molds is such that the tongue and groove portions thereof remain engaged and thus facilitate rapid and accurate operation.

While the methods and forms of apparatus herein described constitute a preferred embodiment of the invention, it is to be understood that the invention is not limited to these precise forms of apparatus, and that changes may be made therein without departing from the scope of the invention which is defined in the appended claims.

What is claimed is:

1. An injection molding machine for molding and blowing hollow articles and comprising supports for a set of cooperating parison molds, supports for a set of cooperating parison molds, supports for a set of cooperating finishing molds, a core having a longitudinally extending valve controlled bore, a core supporting frame, a core carrier slidably mounted on said frame to move said core from an end position between the molds of one of said mold sets to another end position between the molds of the other of said mold sets, means for effecting mold opening and closing movement between the molds of said parison mold set, means for effecting mold opening and closing movement between the molds of said finishing mold set, means for moving said supporting frame along with said core carrier in a plane normal to the plane of sliding movement of said core carrier, in one direction to disengage said core from and in the other direction to re-engage said core with said set of parison molds when said parison molds are in separated condition.

2. An injection molding machine for molding and blowing hollow articles and comprising a base, supports for a set of cooperating parison molds, one of said supports being in fixed relation to said base and the other being movable in relation thereto, a guide frame arranged with its axis in fixed relation to said base and to the axis of said parison mold supports, cooperating finishing mold supports mounted for mold cavity opening and closing movement in relation to said frame, means for moving said movable parison mold support toward the fixed parison mold support to close the mold cavity and away from said fixed mold support to open the mold cavity, a core carrier supporting frame operatively connected to and actuated by said means for moving said movable parison mold support whereby said supporting frame is moved in one direction to bring a core mounted thereon into operative engagement with said fixed parison mold and in the opposite direction to disengage said core from said fixed mold when the mold cavity is open, and means mounted on said core carrier supporting frame and arranged and adapted to move said core carrier in a path between said parison molds and said finishing molds, when the latter are in separated condition whereby in one end position of said core carrier the core is operatively positioned between said parison molds and in the other end position of said core carrier the core is operatively positioned between said finishing molds.

3. In an injection molding machine for molding and blowing hollow articles and wherein a fixed parison mold part and a movable parison mold part are mounted on a base in operative relation to plastic injection mechanism arranged at one side thereof to supply plastic material when said mold parts are in closed relation, and cooperating finishing mold parts, each movable toward and from the other, are supported at the opposite side of said parison mold parts, and a hollow core cooperates with the parison mold parts to form injected material into a parison and with the finishing mold parts to expand the parison into a hollow article, and parison mold actuating means are provided for moving said movable parison mold part toward and away from said fixed parison mold part, and finishing mold actuating means are provided for moving said finishing mold parts each simultaneously toward the other and each simultaneously away from the other, the combination which comprises a core supporting frame operatively connected to and movable during a portion of the mold opening movement of said parison mold actuating means to disengage the core from said fixed parison mold part, and core moving means mounted on said core supporting frame and arranged and adapted to advance said core into parison mold engaging position and, when said core is disengaged therefrom, to withdraw the same into finishing mold engaging position.

4. Injection molding machines according to claim 3 and wherein portions of said core supporting frame at one end thereof are secured to vertically arranged rods each provided with a stop arranged in the path of upward mold opening movement of portions of said movable parison mold whereby during said movement the movable parison mold is lifted away from the fixed mold and with continued opening movement said rods are engaged by a portion of said parison mold opening means and vertically disengaged from said fixed parison mold.

5. Injection molding machines according to claim 3 and wherein the axis of sliding movement of said core on said core supporting frame is vertically offset from and parallel to the longitudinal axial plane of said parison mold parts when in closed relation.

6. Injection molding machine according to claim 3 and means arranged and adapted to admit fluid pressure through an opening in said hollow core to inflate a parison while confined in said closed finishing mold and to displace the inflated article from said mold when the latter is open, and an article intercepting member normally retained in inoperative position at one side of the path of sliding movement of said core on said frame and movable into operative position across said path to intercept articles displaced from said open finishing mold by said fluid pressure.

References Cited in the file of this patent

UNITED STATES PATENTS

| | | |
|---|---|---|
| 2,298,716 | Moreland et al. | Oct. 13, 1942 |
| 2,315,478 | Parkhurst | Mar. 30, 1943 |
| 2,331,630 | Rempel | Oct. 12, 1943 |
| 2,597,558 | Bailey | May 20, 1952 |
| 2,601,700 | Pinsky et al. | July 1, 1952 |
| 2,789,312 | Borer | Apr. 23, 1957 |
| 2,789,313 | Knowles | Apr. 23, 1957 |
| 2,872,700 | Knowles | Feb. 10, 1959 |

FOREIGN PATENTS

| | | |
|---|---|---|
| 1,091,090 | France | Oct. 27, 1954 |